April 14, 1931.          A. SHUMAN                1,800,909
FLOW CONTROL FOR GLASS TANKS
Filed May 22, 1929    2 Sheets-Sheet 1

INVENTOR
Arno Shuman
BY
Augustus B. Stoughton
ATTORNEY.

WITNESS:

Patented Apr. 14, 1931

1,800,909

UNITED STATES PATENT OFFICE

ARNO SHUMAN, OF PHILADELPHIA, PENNSYLVANIA, ASSIGNOR TO PENNSYLVANIA WIRE GLASS COMPANY, OF PHILADELPHIA, PENNSYLVANIA, A CORPORATION OF NEW JERSEY

FLOW CONTROL FOR GLASS TANKS

Application filed May 22, 1929. Serial No. 364,962.

The principal object of the present invention is to avoid, obviate and provide for the correction of deposits or accumulations of chilled and solidified glass when melted glass in sheet form is flowed from a tank, for example, to rolling machinery. Another object of the invention is to flow the sheet of molten glass directly upon the surface of a roller without the intervention of a bridge structure. Other objects of the present invention will appear from the following description at the end of which the invention will be claimed. However, the invention, generally stated, may be said to include an outlet passage provided through a wall of the tank below the normal level of the molten glass, a vertically movable gate arranged at the outlet and over the top edge of which a sheet of molten glass may flow, and means for raising the gate to interrupt the flow of glass and to expose the top edge of the gate for the removal of glass.

The invention also comprises the improvements to be presently described and finally claimed.

In the following description reference will be made to the accompanying drawings forming part hereof and in which Figure 1 is a front view of portions of a glass tank embodying features of the invention.

Figure 1:
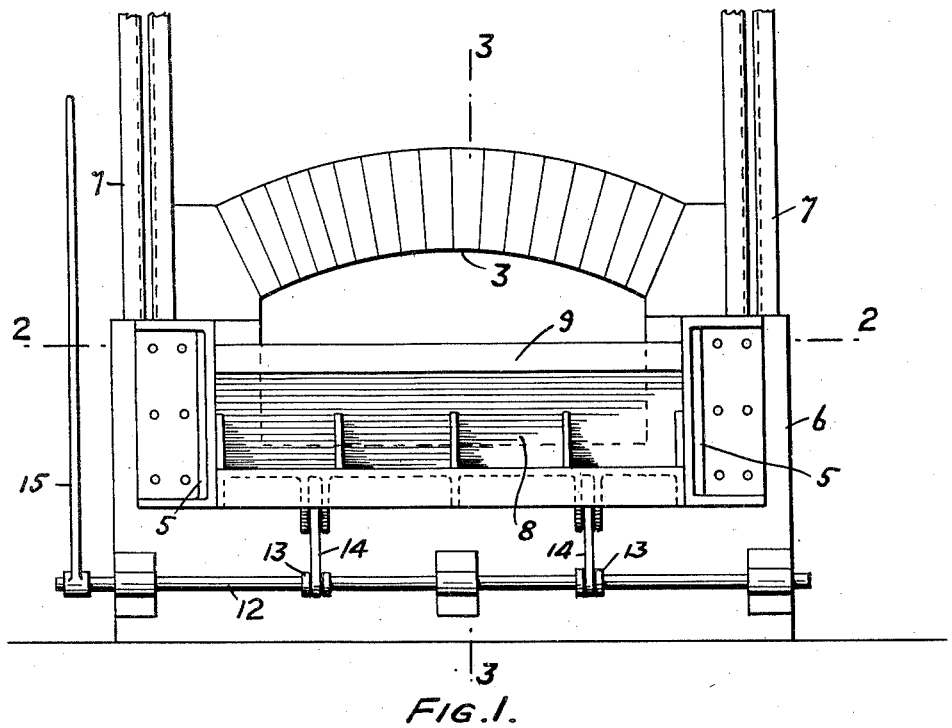
Figure 2:
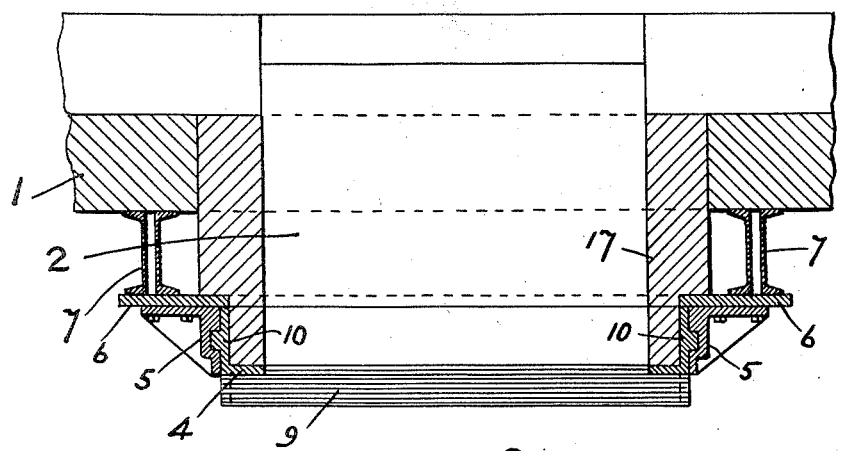
Fig. 2 is a cross-sectional view taken on the line 2—2 of Fig. 1.
Figure 3:
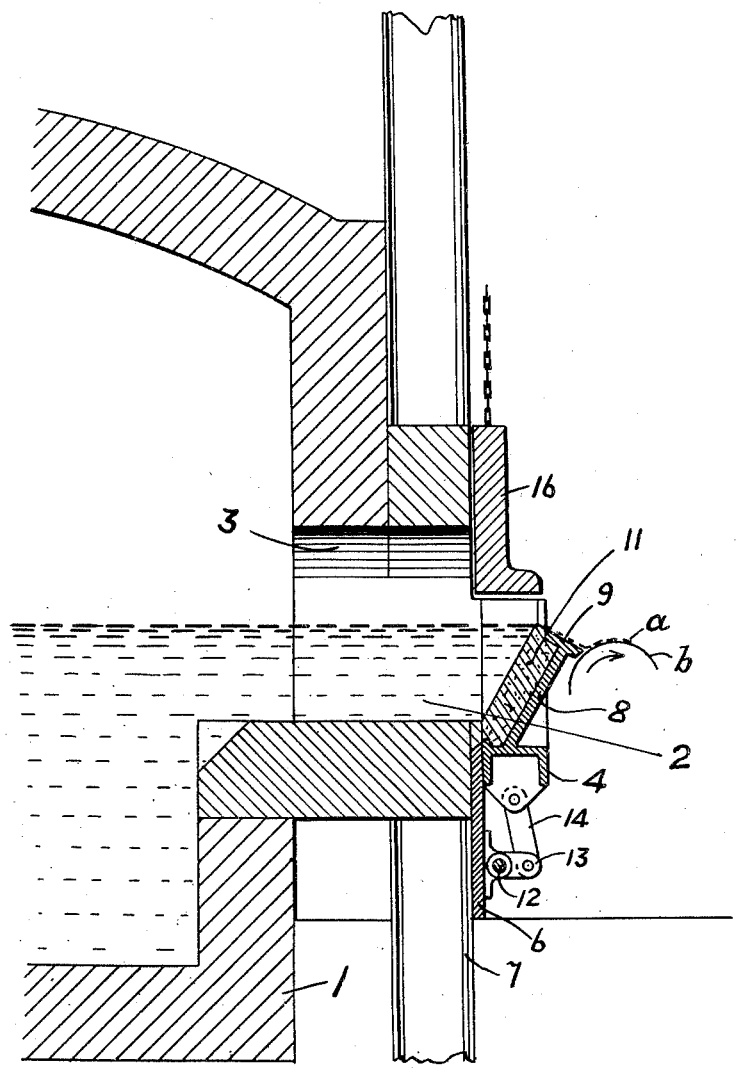
Fig. 3 is a vertical cross-sectional view taken on the line 3—3 of Fig. 1.

In the drawings 1 indicates a portion of a glass tank and the glass tank is provided through its wall and below the normal level of the molten glass with an outlet passage 2. The outlet passage, as shown, is oblong and is surmounted by an arch 3. 4 is a vertically movable gate arranged at the outlet and over the top edge of which a sheet of molten glass may flow. As shown the gate is vertically movable in guides 5 arranged at the end of the gate and secured to the frame 6 which in turn is secured to buck stays 7. As shown the gate comprises a casting having a horizontal channeled lower portion, an inclined intermediate portion 8, a head portion 9 inclined to the intermediate portion, and end portions 10 provided with ribs that work in the guides 5. The gate structure described provides a receptacle for refractory blocks or material 11. At the top of the gate the upper portion of the refractory blocks 11 and the top part of the element 9 provide a surface over which a sheet of glass may flow, as indicated by the dotted line $a$ in Fig. 3. Beneath the gate and as shown mounted in bearings secured to the frame 6 is a shaft 12 having crank arms 13 connected by links 14 with webs provided in the gate structure. Upon turning the shaft 12, for example, by means of the hand lever 15, the gate may be raised from the bottom upward to a point above the level of the glass and in this way the flow of glass is interrupted and at the same time the top edge of the gate is exposed so that glass may be removed from it which is advantageous because when the gate is again lowered to permit the stream of glass to run it does not encounter cold or solidified glass. A hood 16 suitably counterbalanced may be arranged to shield the upper part of the outlet passage and in that way prevent the escape of heat from the tank.

It may be remarked that the refractory material 17 serves to protect the frame or, more accurately, the portion 6 of the frame. It is possible with the described form of gate to flow the stream of glass $a$ directly onto a roller indicated at $b$, but in all cases such an arrangement is not necessary because of the fact that the gate is moved upward to interrupt the flow of glass, thus exposing its top edge for cleaning, is also an important feature of the invention, whether the glass be flowed directly onto the roller $b$ or not.

It will be obvious to those skilled in the art to which the invention relates that modifications may be made in details of construction and arrangement and matters of mere form without departing from the spirit of the invention which is not limited to such matters of otherwise than the prior art and the appended claims may require.

I claim:

1. Flow control for glass tanks comprising an outlet passage through a wall of the tank below the normal level of the molten glass, buck stays for the tank, a frame secured to the buck stays and provided with vertical guides, a gate structure adapted to be raised in said guides and provided with a cavity and with an inclined top edge, refractory material arranged in the cavity having a sharp ridge forming the top edge, and means for raising the gate to project its top edge above the level of glass in the tank and to expose it for cleaning.

2. A glass tank having in one wall thereof an outlet passage below the normal level of the molten glass therein, guide members on said tank adjacent said outlet passage, a gate structure slidable in said guides, a block of refractory material mounted in said gate structure on the side nearest the molten glass and having a sharp ridge forming the top edge thereof, a shaft adjacent said gate structure, crank arms on said shaft, links connecting said crank arms to said gate structure, and a lever connected to said shaft for operating said gate structure.

ARNO SHUMAN.